United States Patent [19]

Cachia

[11] 4,384,803
[45] May 24, 1983

[54] INTEGRAL PLASTIC FASTENER

[75] Inventor: Joseph M. Cachia, Knoxville, Tenn.

[73] Assignee: Allied Corporation, Morris Township, Morris County, N.J.

[21] Appl. No.: 233,740

[22] Filed: Feb. 12, 1981

[51] Int. Cl.³ ............................................ F16B 17/00
[52] U.S. Cl. .................................. 403/345; 403/282; 220/307; 242/107; 411/339
[58] Field of Search .......... 242/107, 107.4 R–107.4 E; 403/280, 282, 285, 276, 274, 289, 345, 361; 411/339, 500–503, 479; 220/307, 315; 217/98, 110, 113

[56] References Cited

U.S. PATENT DOCUMENTS

| | | | |
|---|---|---|---|
| 203,815 | 5/1878 | Bray | 411/501 |
| 3,168,961 | 2/1965 | Yates | 220/307 |
| 3,169,439 | 2/1965 | Rapata | 411/500 |
| 3,385,157 | 5/1968 | Rapata | |
| 3,661,291 | 5/1972 | Hetzer | 220/307 |
| 3,900,183 | 8/1975 | Wallace | |
| 3,915,400 | 10/1975 | Takada | 242/107.4 B |
| 4,204,652 | 5/1980 | Cislak et al. | 242/107.4 R |

Primary Examiner—John M. Jillions
Attorney, Agent, or Firm—Roger H. Criss; Robert H. Johnson

[57] ABSTRACT

An integral plastic fastener for a plastic article in the form of a cylindrical lug extending from the article and a hollow core in the central portion of the lug, the length of the core being greater than the length of the lug, extending into the plastic article. The core has a substantially square or triangular shape. The diameter of the lug preferably is the same along its length.

3 Claims, 6 Drawing Figures

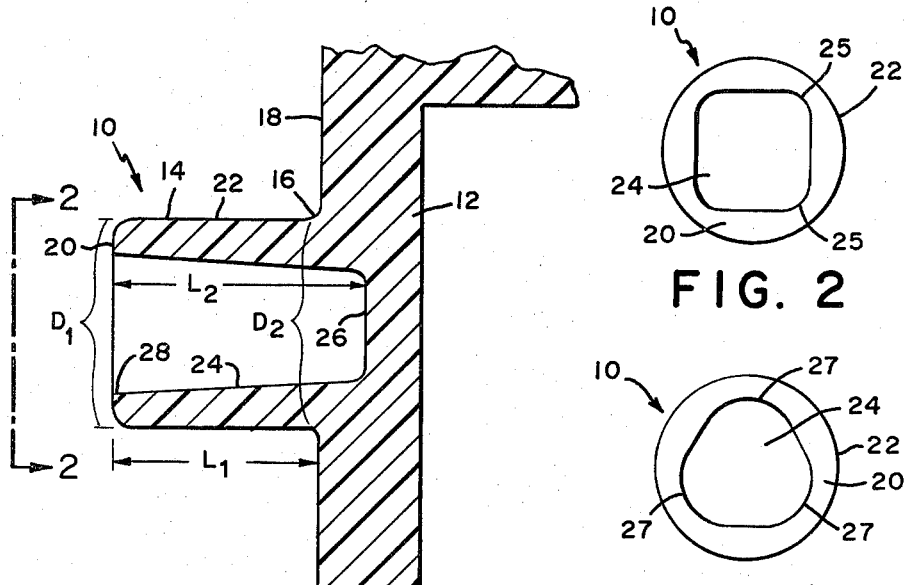
FIG. 1
FIG. 2
FIG. 3
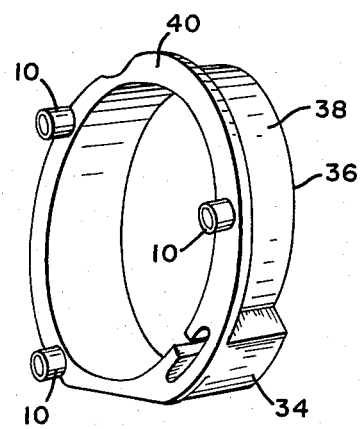
FIG. 6

INTEGRAL PLASTIC FASTENER

DESCRIPTION

BACKGROUND OF THE INVENTION

1. Field of the Invention

This invention relates to integral plastic fasteners, especially for plastic covers to be attached to seat belt retractors.

2. Description of the Prior Art

Devices such as covers for rewind springs and for tension relieving mechanisms have been attached to seat belt retractors by a variety of means. Such means include the use of integral plastic fasteners. For example, plastic push pin-type fasteners have been molded into retractor spring covers. In addition, split pin-type fasteners have been suggested, as disclosed in U.S. Pat. No. 4,204,652 to Cislak et al., for example. Furthermore, integral plastic fasteners for retractor spring covers have been utilized which include outwardly tapered legs.

The prior fasteners, although generally acceptable, are either difficult (and hence relatively expensive) to mold or have extraction strengths which are only moderately high. It would be desirable to provide an integral fastener which was easy to mold and yet offered high extraction strengths.

Cofiled, commonly assigned application of J. M. Cachia, J. M. Lentz and D. M. Lynch entitled "Integral Plastic Fastener" discloses such a fastener which has a hollow core of circular cross-section. It has been found that improved results are obtained with cores of different shapes.

SUMMARY OF THE INVENTION

In accordance with this invention, there is provided, in a molded plastic article adapted to be attached by an integrally molded plastic fastener to a cooperating part having an aperture for receiving the fastener, the improvement comprising:

the plastic article having a first surface, an opposite second surface and a solid central portion between the surfaces;

the fastener comprising an integral lug extending from the first surface outwardly and terminating in a distal end, the portion of the first surface which intersects the lug defining a shoulder adapted to surround the aperture, the central portion of the lug having an axial hollow core of substantially square or triangular shape, the core being surrounded by a solid wall portion, the hollow core extending from a first end adjacent the distal end to a second end which is located interiorly of the first surface so as at least to extend into the solid central portion of the plastic article, the length of the core being greater than the length of the lug; and the outside lateral dimension of the lug being substantially the same adjacent the first surface and adjacent the distal end.

Preferably, the cooperating part is a seat belt retractor and the molded plastic article is a cover for a part of the retractor. Also, preferably the inner walls of the core taper slightly inwardly from the distal end to the second end, and the second end terminates within the central portion of the plastic article. In addition, it is preferred that the outer wall of the lug has a generally circular shape.

The integral fastener of this invention is easy to mold and exhibits very good extraction strength, even after exposure to heat and humidity. In addition, the insertion force is reduced over prior art fasteners and the extraction strength is retained over a wide range of interference fits. Thus, the fastener does not require high tolerances. The lug is retained within the aperture solely by an interference fit due to compression of the plastic material. Compared with the fasteners of the aforementioned application, fasteners with either a substantially square or triangular core fully seat against the apertured walls of the retaining device at high interference fit, whereas the cylindrical core type do not fully seat under such condition. In addition, the fasteners of this invention are not damaged by high interference fit and can thus accommodated greater production variances. At the same time, extraction forces are comparable with the cylindrical core fasteners.

BRIEF DESCRIPTION OF THE DRAWINGS

FIG. 1 is an enlarged cross-section view of the integral plastic fastener of this invention.

FIG. 2 is an end view of the fastener of FIG. 1 taken along line 2—2 wherein the cross-section of the core is square.

FIG. 3 is an end view similar to FIG. 2 wherein the cross-section is triangular.

FIG. 6 is a view of a spring cover of FIG. 4.

DESCRIPTION OF THE PREFERRED EMBODIMENTS

Figure 4:
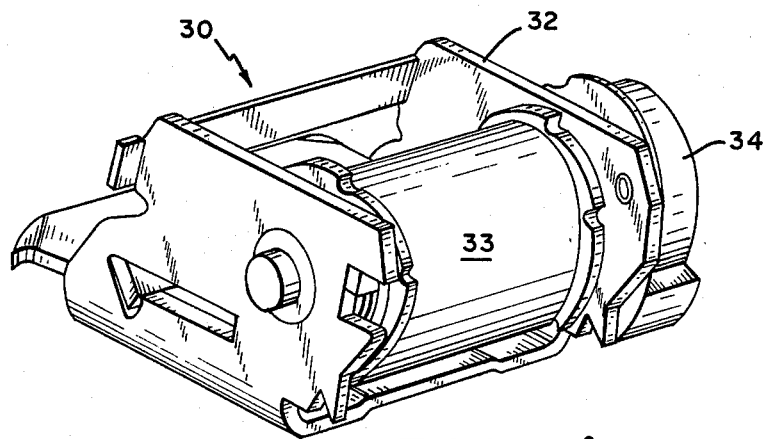
FIG. 4 is a perspective view of a seat belt retractor frame and spring cover mounted thereon by the fastener of this invention.

The fastener of this invention is similar to the fastener disclosed in the aforementioned patent application, the disclosure of which is expressly incorporated herein.

With reference to the drawings, there is shown in FIG. 1 a plastic fastener generally indicated at 10 integrally attached to a molded plastic article 12. A variety of plastic materials may be employed that possess the requisite flexibility, strength, ease of molding and cost benefits; the presently preferred material is nylon. Fastener 10 includes an integral lug 14 that commences at a first end 16 that intersects a first surface 18 of plastic article 12 substantially at right angles and extends outwardly therefrom, terminating in a distal end 20. Outer wall 22 extending between the ends of lug 14 preferably has a circular cross-section and a smooth surface for ease of insertion. The intersection of outer wall 22 and distal end 20 preferably approximates a right angle, but may be slightly rounded for ease in molding.

A hollow core 24 is provided approximately at the center of lug 14 and extends from the distal end 20 of lug 14 towards plastic article 12. Core 24 terminates beyond first surface 18 and preferably in the interior of plastic article 12 at end 26. Alternatively, core 24 may extend completely through plastic article 12, but preferably end 26 is closed to avoid problems with dust, etc. In one embodiment of this invention (FIG. 2), the shape of inner wall 28 which defines core 24 is substantially square at least adjacent end 20. Although the edges 25 of inner wall 28 may be formed at right angles, they are preferably slightly curved for ease in molding. Wall 28 preferably is slightly tapered inwardly from end 20 towards end 26, e.g., a few degrees. However, the diameter of outer wall 22 at end 20 ($D_1$) is substantially the same as the diameter at end 16 ($D_2$) since outer wall 22 is not tapered. It can be seen that the length of lug 14 ($L_1$) is less than the length of core 24 ($L_2$). As pointed out above, lug 24 is flexible and is formed of a compressible material.

In the embodiment according to FIG. 3, the shape of inner wall 28 is substantially triangular. As shown, the intersecting sides of the triangle are preferably slightly rounded at 27 to provide a generally trilobal cross-section for ease in molding.

FIG. 4 illustrates one preferred embodiment of this invention wherein the plastic article is a cover for a part of a seat belt retractor. Retractor 30 includes a frame 32 to which a spool 33 of seat belt webbing is attached. As is conventional in such retractors, a rewind spring (not shown) is employed to bias the seat belt webbing towards the retractor. The rewind spring is typically located on the exterior of frame 32 and is contained within a spring cover 34. Cover 34 has a generally circularshaped flat bottom wall 36 and a side wall 38 which extends outwardly from bottom wall 36 and terminates in a circular mounting flange 40 which extends radially from side wall 38. Flange 40 is provided with a plurality of integral fasteners 10 in the form as shown in FIG. 1. Retractor frame 32 is provided with corresponding round apertures (aperture 42 in FIG. 5) for engagement by lugs 14. The diameter of the apertures is chosen to be somewhat less than the diameter $D_1$ of lug 14 so that the lugs are held by an interference fit within the apertures and are held under compression.

Figure 5:
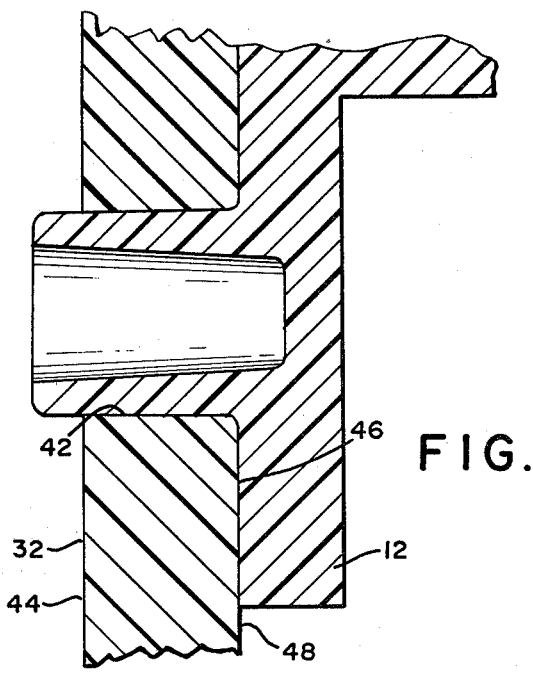
FIG. 5 is an enlarged cross-sectional view of a section of FIG. 4 showing the fastener in place.

As shown in FIG. 5, it can be seen that end 28 of lug 14 extends into aperture 42 and terminates beyond inner wall 44 of frame 32; however, end 28 may alternatively be flush or inset with wall 44. The lower wall 46 of flange 42 adjacent end 16 of lug 14 (which corresponds to surface 18 in FIG. 1) forms a shoulder around lug 14 and is abutted against outer wall 48 of frame 32.

An example of the dimensions of lug 14 are as follows: $L_1 = 3.8$ mm, $L_2 = 4.3$ mm, $D_1 = 4.3$ mm, $D_2 = 4.3$ mm, width dimension of square core = 2.7 mm, height of triangular core = 3 mm, and the thickness of flange 40 = 1.2 mm. The degree of taper is 3°. A typical diameter of aperture 42 is 4.04 mm in a wall having a thickness of 3 mm.

Although in the above description the plastic article has been referred to as a cover for a retractor rewind spring, the cover may also be a cover for a tension-relieving device, for a gear structure or other plastic article.

The fastener of this invention exhibits many advantages over the prior art.

The fastener of this invention exhibits a higher extraction force than prior art fasteners, such as on the order of about 50% higher. At the same time, the insertion force is lower, such as on the order of about 40% lower. Thus, articles incorporating the fasteners are easier to assemble. The high extraction force is retained over a considerable range of interference fit, such as about 0.004 to 0.030 inches (0.1 to 0.76 mm). As a result, the dimensions of the fastener, particularly the outside diameter and wall thickness, do not require close tolerances, thereby reducing manufacturing costs. In addition, the extraction force is not adversely affected by heat and humidity as is the prior art fastener; in fact, the extraction force of the present fastener is increased under such conditions. Furthermore, the extraction force of the fastener is not substantially adversely effected by repeated insertions and extractions. For example, on the order of 90% of the extraction force is retained after two insertion-extraction cycles. Thus, the parts incorporating the present fastener can be reworked, increasing the salvage rate and further reducing manufacturing costs.

The integral fasteners of this invention have been found to fully seat at high interference fits. For example at an interference fit of 0.029 in. (0.74 mm), both the square and triangular cored fasteners fully seat with the apertured surface, whereas the circular cored fastener had a clearance of about 0.010 in. (0.25 mm). Additionally, since the fasteners of this invention are not damaged by high interference fit, they can accommodate greater production variances.

Moreover, it has been found that the square cored fasteners exhibit higher extraction strengths than the circular-cored fastener.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

I claim:

1. In a molded plastic article adapted to be attached by an integrally molded resilient plastic fastener to a cooperating part having an aperture for receiving said fastener, the improvement comprising:

said plastic article having a first surface, an opposite second surface and a solid central portion; and said fastener comprising an integral lug extending from said first surface outwardly and terminating in a distal end, said lug in cross-section having a circular outside surface of constant diameter along its length, the portion of said first surface which intersects said lug defining a shoulder adapted to surround said aperture, the central portion of said lug having an axial hollow core which in cross-section has a generally polygonal shape, said core being surrounded by a solid wall portion, said hollow core extending from a first end adjacent said distal end to a second end which is located interiorly of the first surface so as at least to extend into said solid central portion of said plastic article, the length of said core being greater than the length of said lug and the average width of said core adjacent said first end being greater than the average width of said core adjacent said second end.

2. The article of claim 1 wherein said core in cross-section has a substantially square shape.

3. The article of claim 1 wherein said core in cross-section has a substantially triangular shape.

* * * * *